UNITED STATES PATENT OFFICE.

OTTO SCHMIDT, OF LUDWIGSHAFEN-ON-THE-RHINE, AND KARL HOCHSCHWENDER AND THEODOR EICHLER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

PRODUCING PARTIALLY-HYDROGENIZED MONOCYCLIC HYDROCARBONS.

1,221,382.  Specification of Letters Patent.  Patented Apr. 3, 1917.

No Drawing.  Application filed October 11, 1912.  Serial No. 725,161.

*To all whom it may concern:*

Be it known that we, OTTO SCHMIDT, KARL HOCHSCHWENDER, and THEODOR EICHLER, subjects, respectively, the first of the King of Prussia and the others of the Grand Duke of Baden, residing the first at Ludwigshafen-on-the-Rhine and the others at Mannheim, Germany, have invented new and useful Improvements in Producing Partially-Hydrogenized Monocyclic Hydrocarbons, of which the following is a specification.

It is known that tetrahydro compounds of the benzene series can be obtained from the monochlor substitution products of completely hydrogenized benzene hydrocarbons by heating them with alcoholic potash, or with quinolin (see Markownikoff, *Annalen*, 302, 27; Fortey, *Journal of the Chemical Society*, 73, 941).

We have found that partially hydrogenized monocyclic hydrocarbons can be obtained in much better yield and in a good state of purity by subjecting halogen substitution products of monocyclic paraffins, in the condition of vapor, to the action of a compound which will split off halogen hydrid, either catalytically or by combining with the halogen hydrid. As compounds which are suitable for use according to this invention we mention barium chlorid, alumina, nickel chlorid, caustic lime, soda lime and magnesium oxid. The reaction can be carried out either at ordinary pressure or under reduced pressure, and the temperature should preferably be so chosen that decomposition of the partially hydrogenized monocyclic hydrocarbons is avoided. Suitable temperatures for carrying out the process of our invention lie between about 200° and 500° C., but we wish it to be understood that the optimum temperature for any one particular reaction depends upon various conditions, obtaining such for instance as the compound to be treated, the agent being employed to split off halogen hydrid, and the pressure at which the reaction is being carried out. According to our invention yields can easily be obtained of eighty per cent. or upward.

The following are examples of how our invention can be carried into practical effect, but the invention is not confined to these examples, as, in a similar manner, other halogen monocyclic paraffins can be treated and the temperatures and other details of the examples can be varied within fairly wide limits.

*Example 1.*

Pass vaporized chlor-cyclohexane, at a pressure of from 15 to 20 millimeters, through a tube containing caustic lime and heated so that the internal temperature is from 350° to 450° C. Condense, by means of a strong freezing mixture, the vapors leaving the reaction tube and purify the product, if necessary, by fractional distillation.

In a similar manner, the reaction can be carried out when working under ordinary pressure, and instead of caustic lime other suitable compound, such for instance as magnesium chlorid and soda lime, can be employed.

*Example 2.*

Pass vaporized dichlor-cyclohexane through a tube containing caustic lime heated to from 350° to 450° C., while employing a pressure of from 15 to 20 millimeters. Condense, by means of a strong freezing mixture, the vapors leaving the reaction chamber, wash the product, if necessary, and purify it by fractional distillation. In this manner a good yield of dihydrobenzene is obtained.

*Example 3.*

Pass vaporized chlorcyclohexane through a tube containing dry barium chlorid and heated so that the internal temperature is from 300° to 400° C., while employing a pressure of from 20 to 30 millimeters. Condense, by means of a strong freezing mixture, the vapors leaving the reaction space and wash the liquid with caustic soda to remove any hydrochloric acid. Then dry the liquid and distil it, whereupon tetrahydrobenzene is obtained.

*Example 4.*

Pass vaporized chlor-pentamethylene, at a pressure of from 15 to 20 millimeters, through a tube containing dry barium chlorid, heated so that the internal temperature is from 300° to 400° C. Condense, by means of a strong freezing mixture, the vapors leaving the reaction chamber, wash the liquid with caustic soda, and dry and distil it. In this way a good yield of cyclopentene is obtained.

*Example 5.*

Pass vaporized 1.2-dibrom-cyclohexane, at a pressure of from 15 to 20 millimeters, through a tube containing quicklime, which is maintained at a temperature of about 400° C., and, by means of a strong cooling agent, condense the vapors leaving the reaction space. The product consists chiefly of 1.3-dihydrobenzene, which can be purified from traces of brominated hydrocarbons by fractional distillation.

Now what we claim is:—

1. The process of producing partially hydrogenized monocyclic hydrocarbons by subjecting halogen substitution products of monocyclic paraffins in the condition of vapor to the action of a compound which will split off halogen hydrid while employing a temperature sufficient to effect the splitting off of the halogen hydrid.

2. The process of producing tetrahydrobenzene by subjecting vaporized chlorcyclohexane to the action of a compound which will split off halogen hydrid while employing a temperature sufficient to effect the splitting off of the halogen hydrid.

3. The process of producing tetrahydrobenzene by subjecting vaporized chlorcyclohexane to the action of barium chlorid at a temperature sufficient to effect the splitting off of the halogen hydrid.

In testimony whereof we have hereunto set our hands in the presence of two subscribing witnesses.

OTTO SCHMIDT.
KARL HOCHSCHWENDER.
THEODOR EICHLER.

Witnesses:
J. ALEC LLOYD,
JOSEPH PFEIFFER.